(12) United States Patent
Papajewski et al.

(10) Patent No.: US 8,981,590 B2
(45) Date of Patent: Mar. 17, 2015

(54) HYBRID VEHICLE AND METHOD FOR OPERATING A DEVICE FOR CHARGING A BATTERY IN A HYBRID VEHICLE

(75) Inventors: Jens Papajewski, Unterhausen (DE); Michael Hamacher, Neuburg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/122,980

(22) PCT Filed: Feb. 25, 2012

(86) PCT No.: PCT/EP2012/000821
§ 371 (c)(1),
(2), (4) Date: Nov. 27, 2013

(87) PCT Pub. No.: WO2012/163437
PCT Pub. Date: Dec. 6, 2012

(65) Prior Publication Data
US 2014/0097673 A1    Apr. 10, 2014

(30) Foreign Application Priority Data
May 28, 2011   (DE) .......................... 10 2011 102 766

(51) Int. Cl.
*B60L 1/00*   (2006.01)
*B60L 3/00*   (2006.01)
(Continued)

(52) U.S. Cl.
CPC ............... *B60W 20/106* (2013.01); *B60K 6/46* (2013.01); *B60W 10/08* (2013.01); *B60W 10/26* (2013.01); *B60W 20/102* (2013.01); *H02J 7/044* (2013.01);
(Continued)

(58) Field of Classification Search
CPC . Y02T 10/7005; Y02T 90/14; Y02T 10/7044; Y02T 10/7011; Y02T 10/6291; B60W 10/26; B60W 2510/244; B60W 2710/244; B60W 2530/14; B60L 11/1862
USPC .................................................. 307/9.1, 10.1
See application file for complete search history.

(56) References Cited

U.S. PATENT DOCUMENTS 5,623,194 A    4/1997   Boll et al.
5,892,346 A    4/1999   Moroto et al.
(Continued)

FOREIGN PATENT DOCUMENTS

DE    43 44 368 C1    5/1995
DE    198 07 291 A1   8/1999
(Continued)

OTHER PUBLICATIONS

International Search Report issued by the European Patent Office in International Application PCT/EP2012/000821.

*Primary Examiner* — Carlos Amaya
(74) *Attorney, Agent, or Firm* — Henry M. Feiereisen LLC

(57) ABSTRACT

In order to operate a hybrid vehicle, a mode is provided in which adjustment to the remaining electrical range is performed, specifically said remaining range is kept substantially constant. For example, the driver of the vehicle can continuously maintain the currently determined remaining electrical range by activating an activation element, in order to be able to retrieve said remaining electrical range later for purely electric driving, for example in a low emission zone. Adjustment to the remaining electrical range is more appropriate than the previously known adjustment to the charge state of the battery, because the vehicle driver can better plan his trip.

5 Claims, 2 Drawing Sheets

(51) Int. Cl.
*H02G 3/00* (2006.01)
*B60W 20/00* (2006.01)
*B60K 6/46* (2007.10)
*B60W 10/08* (2006.01)
*B60W 10/26* (2006.01)
*H02J 7/04* (2006.01)
*B60L 11/12* (2006.01)
*B60W 50/08* (2012.01)

(52) U.S. Cl.
CPC ............ *B60L 11/126* (2013.01); *B60W 50/082* (2013.01); *B60W 2540/04* (2013.01); *B60W 2710/244* (2013.01); *Y02T 10/6217* (2013.01); *Y02T 10/7077* (2013.01); *Y02T 10/7005* (2013.01); *Y02T 10/70* (2013.01); *Y10S 903/903* (2013.01)
USPC ............................................ 307/9.1; 903/903

(56) References Cited

U.S. PATENT DOCUMENTS

| 6,414,453 | B1 | 7/2002 | Tamagawa et al. |
| 2006/0278449 | A1 | 12/2006 | Torre-Bueno |
| 2009/0114463 | A1 | 5/2009 | DeVailt |
| 2011/0166733 | A1* | 7/2011 | Yu et al. .......................... 701/22 |

FOREIGN PATENT DOCUMENTS

| DE | 100 41 593 B4 | 4/2001 |
| DE | 10 2007 056 723 A1 | 12/2008 |
| DE | 10 2008 047 923 A1 | 3/2010 |
| EP | 1 256 476 B1 | 11/2002 |
| EP | 1 297 982 A2 | 4/2003 |

* cited by examiner

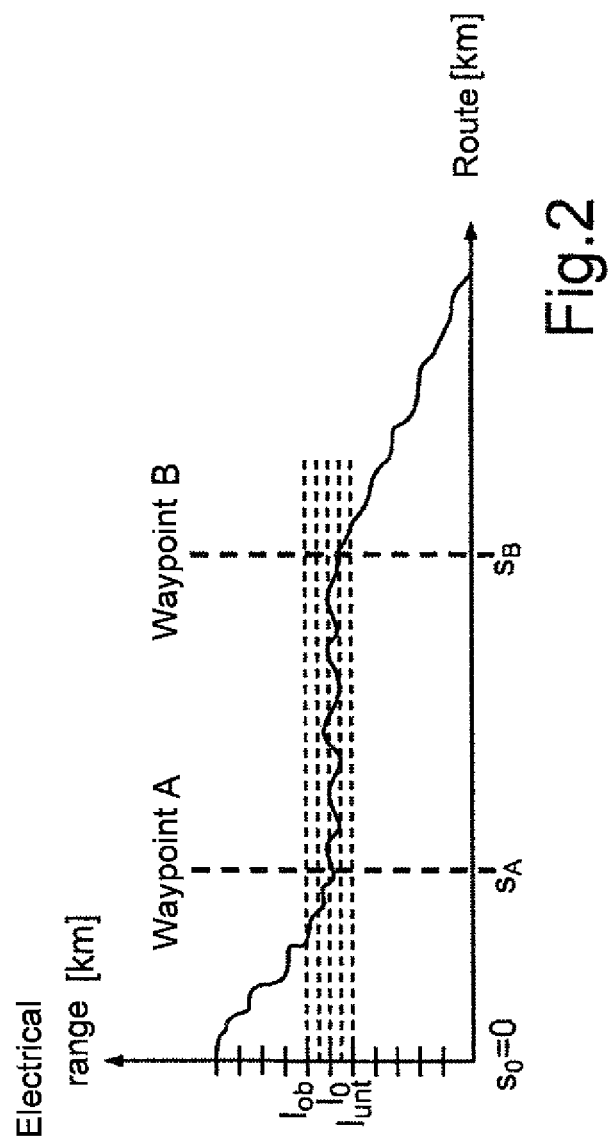

HYBRID VEHICLE AND METHOD FOR OPERATING A DEVICE FOR CHARGING A BATTERY IN A HYBRID VEHICLE

CROSS-REFERENCES TO RELATED APPLICATIONS

This application is the U.S. National Stage of International Application No. PCT/EP2012/000821, filed Feb. 25, 2012, which designated the United States and has been published as International Publication No. WO 2012/163437 and which claims the priority of German Patent Application, Serial No. 10 2011 102 766.5, filed May 28, 2011, pursuant to 35 U.S.C. 119(a)-(d).

BACKGROUND OF THE INVENTION

The invention relates to a hybrid vehicle, i.e. vehicle with an electric drive and an electric energy storage device, in particular a battery for supplying power to the electric drive in operation. The invention furthermore relates to a device for charging the energy storage device, wherein such device typically includes an internal combustion engine with an associated generator, wherein the generator may be the electrical drive, but typically is a machine different from the electrical drive. The invention also relates to a method for operating such a device for charging an electric energy storage device in a motor vehicle.

Hybrid vehicles typically have a so-called operating-mode switch which an operator can operate to select whether the hybrid vehicle should drive exclusively electrically, i.e. whether exclusively electric energy should be drawn from the electric energy storage device to operate the electric drive, or whether a hybrid driving mode is preferred as an operating mode, i.e. an operating mode of the hybrid vehicle, wherein electric energy for powering the electric drive is drawn from the energy storage device at the same time as electric energy is supplied to the energy storage device for charging the energy storage device.

DE 100 41 593 B4 discloses a controller for a hybrid vehicle wherein the voltage is regulated to the voltage of an electric energy storage device. The so-called SOC conservation is known in the art, wherein the state-of-charge of the battery is maintained by operating a Range-Extender. Disadvantageously, it is difficult for the driver to determine the remaining range of the motor vehicle from the optionally displayed state-of-charge of the battery. A targeted manual distance-based adjustment by the driver is not possible.

DE 10 2008 047 923 A1 is concerned with considering a desired electrical range within a process for optimizing operation of a vehicle. A targeted route is assumed and starting a state having a desired electrical range is back-calculated from this targeted route.

SUMMARY OF THE INVENTION

It is the object the present invention to configure the operation of a hybrid vehicle in a novel fashion, which obviates the disadvantages of the prior art and which more particularly enables the driver to better plan the trip with the hybrid vehicle without foregoing options for driving the hybrid vehicle.

The object is attained in one aspect with a hybrid vehicle with an electric energy storage device, an electric drive receiving electrical current from the electric energy storage device, and a charging device for charging the energy storage device. The hybrid vehicle can be operated in an operating mode wherein a remaining electrical range determined with a predetermined criterion relating to driving with the electrical drive, where the device for charging not operated, is held constant by repeatedly or continuously operating the charging device in accordance with a predetermined criterion. The hybrid vehicle further includes a device for defining a value for the remaining electrical range to be held constant, with the device for defining a value comprising a control element, wherein upon actuation of the control element, an actually determined value for the remaining electrical range is used as the value to be held constant.

According to another aspect, a method for operating a charging device for charging an electric energy storage device in a motor vehicle, wherein the energy storage device is used to supply power to an electrical drive, includes determining in accordance with a predetermined criterion an electrical range for the vehicle when operating the electric drive without operating the charging device, and operating the charging device such that the electrical range remains constant as specified based on discrete values, wherein after a control element is actuated, an actual value for the remaining electrical range is used as a value to be held constant.

The hybrid vehicle according to the invention can thus be operated in an operating mode with a control, wherein the control target is to keep a remaining range determined in accordance with a predetermined criterion when driving with the electrical drive, where the device for charging is not operated, while repeatedly or constantly operating the charging device in accordance with a predetermined criterion.

The invention thus starts by controlling a desired state-of-charge of the battery. Depending on the external conditions, a particular state-of-charge of the battery may provide a different remaining range. By controlling the remaining range directly, the driver of the hybrid vehicle is better able to plan the trip. Optionally, a value for the remaining range is specified to the driver, thereby considerably simplifying the operation of the hybrid vehicle.

The operating mode may preferably be selected by the driver himself, wherein particularly a device for defining a value for the remaining range to be kept constant is included. By allowing the driver himself to define the value for the remaining range, he can always retain a reserve of electric energy while driving the hybrid vehicle, so that he can still drive at the end of the operating mode a remaining distance according to the remaining range previously held constant. In this way, the driver can in particular plan to subsequently drive the hybrid vehicle purely electrically; for example, he can plan to drive during a long-distance trip electrically to the destination in a later city trip. However, operating only a selection switch for the hybrid or the purely electric drive would not ensure the availability of an adequate remaining electrical range. However, when a value for the remaining range can be defined and a constant remaining range is then controlled, this remaining range can be more or less exactly retrieved at a later time.

According to a preferred embodiment of this aspect of the invention, the device for defining a value for the remaining range includes a control element, which when actuated causes a respective actually determined value for the remaining range to be used as the value to be held constant. For example, when the respective remaining range for driving exclusively electrically is continuously displayed, the driver may at some point actuate the control element in order to effectively "freeze" and preserve the actual remaining range. The vehicle then automatically ensures that the remaining range is maintained even in its assumed operating mode.

The device for charging includes in a known fashion an internal combustion engine with a generator, a so-called Range-Extender.

The method according to the invention is characterized in that in accordance with a predetermined criterion (which more particularly does not exclusively relate to the state-of-charge of the electric energy storage device) a range for the motor vehicle when operating the electric drive without operating the device for charging is determined, and that the device for charging is operated such that this range remains constant as defined based on discrete values.

In this aspect, the invention takes into account that a range calculated with a precision of millimeters may briefly vary. However, when the range is specified in steps, for example by discrete values spaced of 1 km and 10 km and preferentially between 2 km and 5 km, then the device for charging the electric energy storage device can be operated to ensure that the surrounding interval associated with the discrete value is not left, i.e. that the adjacent discrete value is not reached. This is for example a predetermined criterion according to which the remaining range is held constant.

The method is preferentially here also performed after receiving an input which defines a value for the range to be held constant, wherein preferably an actual value for the range determined according to a predetermined criterion is defined via the input as a value to be held constant. The aforementioned advantages of this embodiment for the hybrid vehicle apply, mutatis mutandis, also to the method.

BRIEF DESCRIPTION OF THE DRAWING

A preferred embodiment of the invention will be described below with reference to the drawing, which shows in.

DETAILED DESCRIPTION OF PREFERRED EMBODIMENTS

Figure 1:
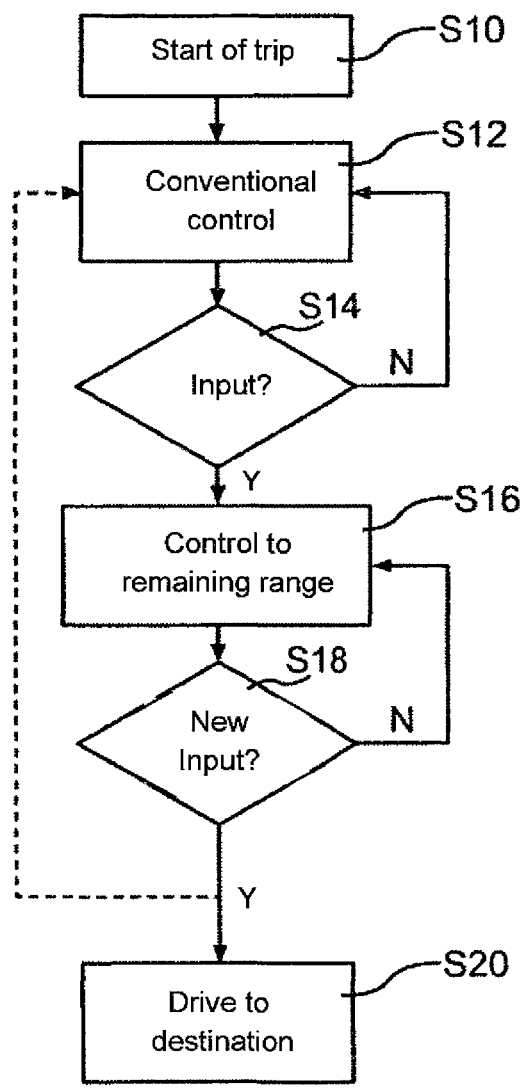
FIG. 1 a flow diagram describing an embodiment of the method according to the present invention, and FIG. 2 a diagram of the so-called electrical range as a function of a route driven by a hybrid vehicle with a Range-Extender.

It will be assumed here that a hybrid vehicle includes an electric drive which receives an electric current from a battery. A Range-Extender with an associated separate generator is used to produce the electric energy stored in the battery.

The Range-Extender does typically not supply the total electric energy required for the driving. Instead, the battery is charged before a trip at an external charging station, for example at a standard electrical outlet and is charged at the start of the trip to its maximum capacity. The so-called electrical range is thus a maximum at the waypoint $s_0=0$, i.e. the range the vehicle can travel without the need to operate the Range-Extender.

After the start of the trip at step S10, the vehicle is operated conventionally at step S12, for example by controlling the state-of-charge of the battery SOC, an exclusively electric method and the like. It will now be assumed that the electrical range then further decreases after traveling the distance $s_A$ to the waypoint A. It is checked during the trip at step S14, whether the driver has actuated a specific button. As long as this not the case, the travel continues at step S12 as before.

In the present example, this actuator is actuated by the driver at the waypoint A after traveling the distance $s_A$. As a result, the remaining electrical range is regulated at step S16, wherein the remaining electrical range is held constant to the greatest possible extent. "To the greatest possible extent" is meant to indicate here that the fluctuations in the remaining electrical range are so small that a discrete classification of the values for the electrical range is unable to capture these fluctuations. For example, when the electrical range is controlled to the value $I_0$ and fluctuates only so that not even half of the interval to the next possible measurement value $I_{ob}$ or $I_{unt}$ is reached.

It is sufficient for specifying the remaining range to select relatively generous intervals. For example, the remaining range can be stated in intervals of 5 km, for values of less than 20 km possibly in steps of 2 km. For example, with a value of $I_0=25$ km in the aforementioned example, keeping this value constant with a discretization of 5 km (i.e. with $I_{unt}=20$ km and $I_{ob}=30$ km) means that the remaining range is held constant in accordance with a predetermined criterion, namely within the interval from for example 22 km to 28 km.

It is checked at step S18, whether a new input has occurred. As long as this is not the case, the remaining electrical range is controlled. After driving the distance $s_B$, i.e. when reaching the waypoint B, a new input is to be captured at step S18. Accordingly, driving is exclusively electrical at step S20 until the end of the trip, i.e. the aforementioned remaining electrical range $I_0$ has been traveled. Alternatively, the process can return to step S12 and the previous control can be performed again until an input occurs once again at step S14.

With the method according to the invention, the driver has now the option to effectively "freeze" the remaining range $I_0$ when only this particular remaining electrical range $I_0$ is available. He can then keep this remaining electrical range in reserve (providing that sufficient fuel is available for operating the Range-Extender) by operating the Range-Extender in a range which would allow the driver to travel the remaining distance at a later time e.g. exclusively electrically after reaching the waypoint B, for example in an environmental zone where the Range-Extender should not be operated.

The remaining electrical range is controlled in the present situation, which is different from a conventional control of a fixed state-of-charge of the battery. Although the remaining electrical range is dependent on the state-of-charge of the battery, the actual vehicle speed also enters the remaining range in this example, and further indirectly via the operation of the Range-Extender also the capacity of the fuel tank, and more particularly the remaining electrical range is also dependent on the drive power the electric drive and the power consumed by the secondary loads in the motor vehicle. When one of these parameters changes, the remaining electrical range can change, without changing the state-of-charge of the battery. In order to keep the remaining electrical range constant, the state-of-charge of the battery may also have to be adjusted. For example, after having driven for a certain duration on level terrain, the power consumed by the drive may increase when driving uphill, resulting in a decrease of the remaining electrical range. By activating the Range-Extender during uphill travel at least after a predetermined period of time, the state-of-charge sufficient for the previously held constant remaining electrical range is then not changed to a higher state-of-charge.

The remaining range is calculated in a conventional manner using conventional algorithms. The calculation of the remaining range is based on the way in which at least a portion the covered distance has been traveled, i.e. how much energy was consumed, which this is then extrapolated. When the energy consumption changes, higher energy consumption is given more weight than lower energy consumption. So-called average profiles for the vehicle are used to estimate the remaining range at a specific vehicle speed.

The present invention enables the driver to plan more accurately when he desired to drive exclusively electrically. By maintaining a specific number of kilometers for the remaining range, the driver is better able to plan than by keeping the state-of-charge of the battery constant.

The invention claimed is:

1. A hybrid vehicle comprising:
an electric energy storage device,
an electric drive receiving electrical current from the electric energy storage device,
an onboard charging device for charging the energy storage device,
wherein the hybrid vehicle can be operated in an operating mode wherein a remaining electrical range, which is determined with a predetermined criterion relating to a situation where the electrical drive is driven when the onboard charging device is not operated, is held constant by repeatedly or continuously operating the charging device in accordance with the predetermined criterion, and
a device for defining a value for the remaining electrical range to be held constant, with the device for defining the value comprising a control element, wherein upon actuation of the control element, an actually determined value for the remaining electrical range is used as the value to be held constant,
wherein the remaining electrical range depends on a state-of-charge (SOC) of the electric energy storage device and at least one of an actual vehicle speed and a capacity of a fuel tank of the onboard charging device.

2. The hybrid vehicle of claim 1, wherein the onboard charging device comprises an internal combustion engine with a generator.

3. A method for operating an onboard charging device for charging an electric energy storage device in a motor vehicle, wherein the energy storage device is used to supply power to an electrical drive, the method comprising:
determining in accordance with a predetermined criterion an electrical range for the vehicle in a situation where the electric drive is operated without operating the charging device,
operating the charging device such that the electrical range remains constant within a specified range based on discrete values, and
using in response to actuation of a control element an actual value for a remaining electrical range as a value for the remaining electrical range to be held constant,
wherein the remaining electrical range depends on a state-of-charge (SOC) of the electric energy storage device and at least one of an actual vehicle speed and a capacity of a fuel tank of the onboard charging device.

4. The method of claim 3, wherein the discrete values are defined in intervals from between 1 km to 10 km.

5. The method of claim 4, wherein the discrete values are defined in intervals from between 2 km to 5 km.

* * * * *